United States Patent

[11] 3,604,994

| [72] | Inventor | William J. Conlon |
| --- | --- | --- |
| | | New Britain, Conn. |
| [21] | Appl. No. | 867,315 |
| [22] | Filed | Oct. 17, 1969 |
| [45] | Patented | Sept. 14, 1971 |
| [73] | Assignee | Dynamics Corporation of America |
| | | New York, N.Y. |

[54] LIQUIDIZER SPEED CONTROL
16 Claims, 8 Drawing Figs.

| [52] | U.S. Cl.................................. | 318/252, |
| --- | --- | --- |
| | | 318/305, 318/351 |
| [51] | Int. Cl.................................. | H02p 7/10 |
| [50] | Field of Search.......................... | 318/252, |
| | | 305, 351 |

[56] References Cited
UNITED STATES PATENTS

| 3,286,150 | 11/1966 | Wilson et al................ | 318/351 |
| --- | --- | --- | --- |
| 3,324,371 | 6/1967 | Stauffer..................... | 318/225 |

Primary Examiner—Oris L. Rader
Assistant Examiner—K. L. Crosson
Attorney—Harbaugh & Thomas ABSTRACT: A food-comminuting device driven by a universal fractional horsepower motor in which a speed control includes oppositely poled serially connected semiconductors that shunt a field of variable impedance for a high speed range and one of the semiconductors is switched into series relationship with the field for a low speed range to eliminate any overlapping of the speed ranges. The motor can be turned OFF in three ways with the speed control switches by removing the semiconductors from the motor circuit or permutation opening of a plurality of the speed control switches employed, or both.

PATENTED SEP 14 1971

3,604,994

INVENTOR
WILLIAM J. CONLON
By Harbaugh & Thomas
Attorneys

LIQUIDIZER SPEED CONTROL

CROSS REFERENCES

Swanke et al., Ser. No. 813,957, which is incorporated herein by express reference thereto, and Swanke et al., Ser. No. 766,280.

BACKGROUND OF THE INVENTION

Universal motors having infinitely variable speed characteristics that are related to the number of and the relative impedances of the field coils in the field and a wide selection of speeds is provided by the permutations of the coils that have significant differences.

In providing a wide spread of significantly different speeds, the same number of switches as there are speeds have heretofore been devoted to speed control, each field coil requiring an open connection at one or both ends so that any coil not in use will not be short circuited when other coils are connected in the working circuit. To accomplish this multiple pushbutton switches have been used for this purpose in great numbers as electrical appliance controls for selected performance patterns. Multiple switching with more and more buttons has increasingly been used in home and industry.

Diodes have also been employed in series with universal motors to provide a speed selectivity in addition to that provided by a full-wave-alternating current. A half-wave-rectified current is provided by one diode and this is further modified by a second diode shunting the field during half-wave operation. The selectivity provided by triple permutation supplies three separate speeds for a given impedance of the motor field. The second diode, when in circuit, operates to eliminate any reverse current flow in the field between the rectified half-cycles. The second diode has been switched out of the circuit when not used. It is manifest however that regardless of the number of switches involved there must be as many pushbuttons or control elements as there are different functions provided.

Multiple pushbutton switch assemblies generally employ a plurality of permutation slide bars, each of which slides between two positions to provide permutations in various relationships and these switches and their multiple connections are significant cost items related to both material and labor.

SUMMARY OF THE INVENTION

In the present invention two diodes are serially connected back-to-back across the motor field with their common connection subjected to opposite phase currents from opposite terminals of the field. Predominantly the currents are the positive half-cycle from one terminal and the negative half-cycle from the other terminal. Current flow in either direction is thereby blocked through the shunt. This parallel arrangement of the serially connected diodes shunting the field is connected in series with the motor armature and operates to power the motor with full-wave-alternating current for one range of speed. One diode is shunted by a switch in a connection between said common connection and one of the field terminals to supply rectified half-wave current to the field. The second diode confines the flow of the half-wave current of the first diode to the field and shorts any reverse current flow of opposite phase that may be developed in the field between the half-cycles thereby inducing a braking effect upon the armature to stabilize the motor speed with respect to any impedance of the field and the applied half-cycle current to provide another range of speeds.

Assuming a range of stepped predetermined impedances for the motor field, the two ranges of speeds developed by field coil permutations along with the above use of the diodes in the above arrangement at the respective impedances will be separated so that there is an appreciable speed difference between the highest speed when the motor is operated on the half-cycle current and the lowest speed when operated on full-wave-alternating current. Furthermore, two switches employed to implement this arrangement of high and low speed ranges with the same impedances may be used to eliminate a separate ON and OFF switch. Also, in using the same impedances in the high and low speed ranges, the motor can either or additionally be turned "OFF" by an eighth permutation of six switches which otherwise provides seven distinct speeds in each speed range totaling 14 speeds with automatic diode control.

Moreover in the present invention the number of pushbuttons are desirably maximized, the number of switches and coils minimized, as further explained later, and by way of illustrating the invention four field coils of different impedances preferably cowound in pairs are illustrated for use with a two pole universal motor. The windings may be divided between the two poles of a closed stator or be a single winding upon the bight of a U-shaped stator core whose legs are the poles. In all embodiments the armature is magnetically coupled between two stator poles.

Preferably the coils are permutated and energized to provide significantly different speeds both with and without the diodes in the circuit for AC operation and, alternatively, with or without a timer or main switch.

A further object of the invention is to provide circuit patterns for varying the field impedance of plural field coils of different impedances on each of two stator poles in which their four ends are selectively connected in four permutations by three switches and the four permutations, one of them on one of the poles includes a position in which all three of its switches are open.

Another object is to provide permutatable circuits including switches which can be particularized for appliances, preferably with additional permutations for significantly different operational patterns with a restricted number of switches, and, with new permutations to reduce the number or size of switching elements involved.

Other and further objects appear in the description taken with the embodiments shown in the drawings in which:

FIG. 1 is a fragmentary perspective view of a liquidizer and control as representative of food comminution and including a multiple pushbutton switch and diode circuit arrangement embodying the invention.

FIG. 2 is a transverse sectional view of the switch shown in FIG. 1.

FIGS. 2 and 5 are enlarged views of the push rods employed to control the operation of the sliders shown in FIG. 2 with transverse pairing of push rods for alternate actuation of as many as two of the six sliders in FIG. 5 and joint operation of at least said two sliders simultaneously.

IN THE DRAWINGS

Figures 1, 2, 5:
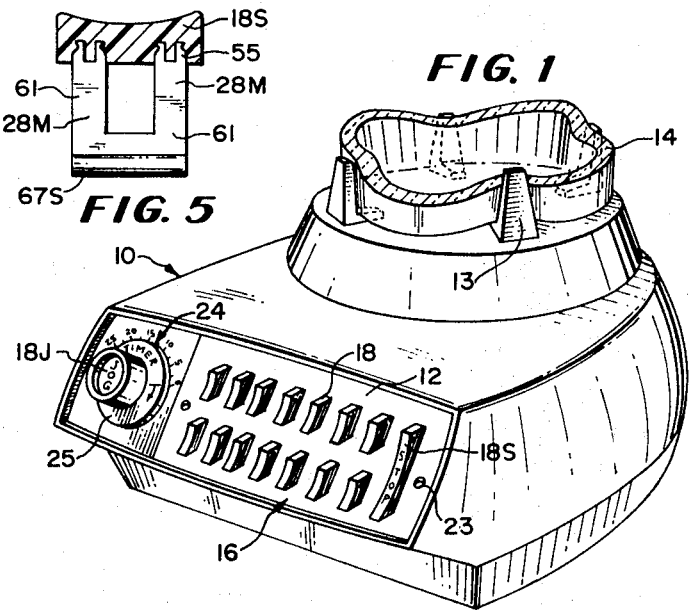

Referring now to the drawings in further detail the base 10 of a universal motor-driven liquidizer is shown in FIG. 1 having a switch control panel 12, and a well-known cloverleaf-shaped jar 14 with cutters (not shown) supported in operative position on the upper surface in a well-known manner by four upstanding guide supports 13. The panel 12 supports a multiple pushbutton switch 16 with one or two rows of pushbuttons 18 extending through the panel for selective actuation by the operator. Reference is made to Swanke 813,957 for a further detailed description of the general construction of this switch. Two rows of pushbuttons 18 are shown at least seven buttons thereof in each row (FIG. 8) are devoted to speed selection with six switches ① to ⑥ permutated thereby for the purpose. One button 18S is a composite button bridging the two rows and serves as a "stop" button 18S.

In addition to the multiple switch 16 a timer 24 (or "T" FIG. 6) is shown mounted on the panel for manual rotation of the dial 25 to close its switch that is connected in parallel with a main switch as later described which if present, can be closed when any one of the speed buttons 18 is pressed, or, can be located in the timer 24 to be operated by a "jog" button 18J that is reciprocably mounted in the center of the dial 25 and is large enough to be easily actuated yet recessed to avoid inadvertent actuation.

Figure 3:
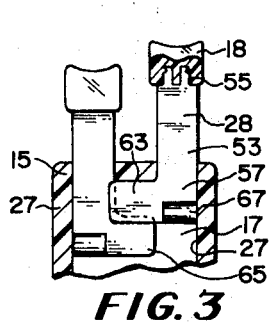

The construction of the multiple switch 16 as shown in FIGS. 2, 3 and 5 is somewhat conventional in that it has a hollow elongated housing 20 molded of suitable insulating material having an upright central portion 15 defining a slider chest 17 and adapted at its ends to receive mounting screws 23 (FIG. 1). The sidewalls 27 support the six sliders 32 in an assembly for relative longitudinal reciprocation. Opposing vertical grooves 31 in the sidewalls 27 receive push rods 28 supporting the buttons 18 in guided relation where they extend upwardly from the slide chest through narrow slots 34 in the top of the central portion 15 for purposes of selective actuation. The switches numbered from ① to ⑥ that are actuated by the sliders 32 are located below the sliders and comprise a row of stationary terminals 44 having downwardly facing fixed contacts 43. Along the other side are the other terminals 46 resiliently supporting one end of bridging conductors 48 whose other ends provide contact areas 47 urged to close against the stationary contacts 43 in an upward direction when free to do so. A flat cover plate 50 of insulating material is secured to the housing 20 by suitable means to close the switch chamber with sufficient clearance to permit operation of the bridging conductors 48 and support the sliders with respect thereto.

Figure 4:
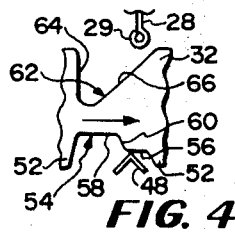
FIG. 4 is a fragmentary enlarged elevational view of a speed selector switch slider at a single switch station as constructed according to the invention to interengage a push rod and switch.

The sliders 32 of the embodiment shown in FIG. 4 are shown as six in number which includes one or two diode control sliders 32D as more particularly described in said Swanke et al. 813,957 application. The remaining four sliders constitute permutation switch sliders 32. All are made of insulating phenolic board and are supported by extensions 52 (FIG. 4) spaced along their lower edges and slidably bearing against the cover plate 50 to carry the downward thrust of the push rods 28 actuating them. Between successive extensions 52, as shown in detail in FIG. 4, the sliders have recesses 54 at each switch station indicated by the conductors 48 and are provided with various shapes including cams to operate or not operate the conductors as their permutation requires.

Generally, if a conductor 48 is to be actuated at a particular recess, the recess is provided with a cam contour having a short high dwell 56 and a long low dwell 58 separated by a cam incline 60 which either closes the switch or opens it depending upon the relative location of the conductor and the direction of movement of the slider when actuated. Thus, when a conductor 48 is open the corresponding recesses 54 of the sliders are so arranged with respect to the switch conductors 48 that one or more high dwells 56 of those present at that station engages the conductor to hold the switch open in a downward direction, and when a switch is to be closed the low dwells 58 in all recesses 54 at that station coincide to permit the resilient conductor 48 to rise and close the contacts 43 and 47.

Figure 8:
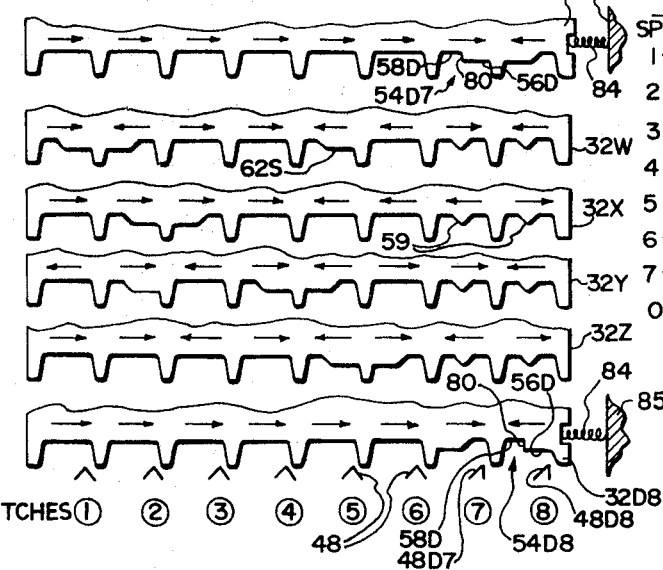
FIG. 8 is a composite view of the switch-engaging portions of the speed selector sliders employed with the circuit shown in FIG. 6 for the 14 speeds, including control of the diodes and the OFF position.
Figure 7:
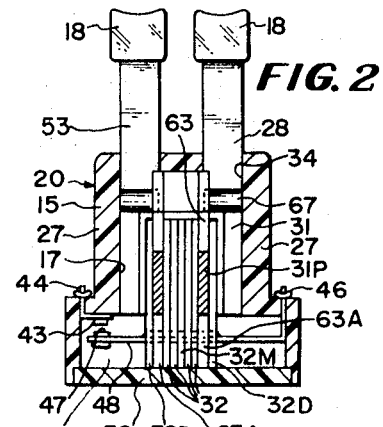
FIG. 7 is a chart of 14 possible speeds of significant differences available with the circuit shown in FIG. 6 including the indication of field coils involved for the speed permutations along with the switches that are closed for each speed, switches 7 and 8 being available for operating the diode switches including an "OFF" position for both switches and diodes.

For permutation of the sliders 32 and thereby the switch closings, the upper edges of the sliders have notches 62 for each push rod 28. The notches generally defined a vertical side 64 and a side inclined thereto to provide an actuated cam surface 66 for moving the slider in the direction indicated by the arrow (FIG. 4). In FIG. 8 full sliders are shown as described but for the sake of simplicity only the lower recessed portions are shown and arrows indicate the slider movement induced by the push rods at each notch 62 station. All push rods 28 for FIGS. 7 and 8 are identical, being curled on the bottom end as at 29 to a cylindrical form and constructed to provide the double row of pushbuttons 18 for the permutation switches ① to ⑧. The push rods are cross paired to operate in the same notches 62 of the sliders 32 and for this purpose are constructed as shown in FIGS. 2 and 3. All are identical for inventory purposes and each comprises an L-shaped stamping 53 of heavy sheet metal notched at 55 in the top edge to receive the pushbuttons 18 and rounded along the bottom edge of their toe portions 65 to engage the permutation switch sliders 32 and are curled at 67 along their heel portions 57 where they slidably engage the respective diode sliders 32D7 and 32D8 when engaging in their respective diode notches 62. The toe portions 65 are flat so that two of them cooperate face-to-face (FIG. 3) in each permutation slider notch. The heel portion 57, having the curl 67, moves in guided relation in the vertical groove guideways 31 in the wall of the chamber 17. A U-shaped push rod 61 (FIG. 5) for the "OFF" is provided with a rounded curled edge 67S extending the full length of the lower edge since the "OFF" button preferably is unitary and is secured to both vertical legs 28M of the push rods 61.

The overlapping toes 63 are guided in vertical notches 63 in two rectangular phenolic guide plates 31P which cooperate with the grooves 31 to rigidify the operation of the push rods at their curled portions without deviation in the slider notches 62, and along their lower edges the guide plates are recessed as at 63A to guide the resilient conductors 48 and support them in their vertical movement against lateral displacement when cam actuated by the sliders, as more particularly described in the Swanke et al. applications Ser. No. 766,280.

Figure 6:
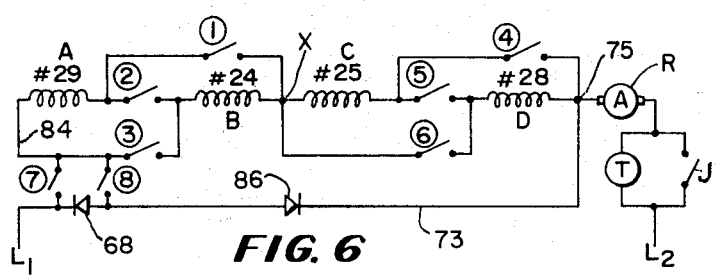
FIG. 6 is an electrical schematic of a representative circuit embodying the present invention where the armature is connected electrically outside the field coils and disposed magnetically between pairs of cowound coils of different impedances which are bridged by serially connected oppositely poled semiconductors in the high-speed range.

Referring to the circuit shown in FIG. 6 it will be noted that the two pairs of coils AB and CD are connected in identical switch patterns where switches (1) and (4), (2) and (5), and (3) and (6) occupy like positions. Taking the pattern of switches (1), (2) and (3) as representative it is shown in the chart, FIG. 7, that either one or more switches (1), (2) and (3) are involved in each permutation to provide seven speeds yet switch (2) is never closed when either or both of switches (1) and (3) are closed, thereby preventing any shorting of the coils.

The coils illustrated each having 120 turns, and by way of example coil A has 029 gauge wire, coil B has 024 gauge wire, coil C has 025 gauge wire and coil D has 028 gauge wire. The armature has 55 turns in each coil of 028 gauge wire. A and B coils and C and D coils are cowound simultaneously so that turns of the coils of smaller gauge wire nest in the interstices of the larger gauge wire for compactness.

Coils B and C are connected at their electrically adjacent ends to a common connection X and coils A and D can have their electrically adjacent ends connected individually to the connection X through switches (1) and (6) respectively. The other ends of coils A and D are connected to terminals 84 and 75, respectively, and the other ends of coils B and C can be be connected to terminals 84 and 75 by switches (3) and (4) respectively. One of the terminals 84 or 75, terminal 75 being elected for illustration is connected to the armature R and to one side of the powerline $L_1$ through a connection 73 having serially connected, oppositely poled semiconductors 68 and 86. The terminal 84 may be connected to the interconnection between the diodes by a switch (8) or alternately therewith to the powerline $L_1$ by switch (7). The other side of the armature is connected to the powerline $L_2$ through connection 76 and this connection may include the timer 24 or jogger switch.

The impedance provided by the respective coils is represented by the gauge size of the conventional copper field-coil wire employed in them as based upon their circular mils and the rank range of speeds from 1 to 7 with respect to the coil combinations employed indicates graduated impedance relationship from high to low to provide speeds from low to high. The diode 68 doubles the number of speed selections by selectively changing the full-wave current across the motor to a half wave electrical potential when the switch (7) is opened. The speed ranges however overlap. The diode 86 when switch (8) is closed while switch (7) is open removes spurious currents occurring in the field during the half-wave operation and separates the two full ranges of speed.

Thus with the same series of coil permutations for both speed ranges 14 speeds can be provided by alternately opening and closing switch (7) and (8) with respect to each other with as little as seven switches and five permutation sliders, leaving available for "OFF" purposes the remaining switch (8) of a multiple pushbutton switch having eight switches.

Accordingly, with the diodes poled oppositely in series across the field, no current will flow through the motor when both switches (7) and (8) are opened, thereby providing an "OFF" condition.

On the other hand it is also to be noted that with the opposed diodes across the field, either one could be left in closed position, preferably switch (8) and "OFF" conditions would prevail if the circuit through the field was opened.

In this connection since there are eight permutations for six switches employed and only seven of these permutations are employed, the remaining permutation may be used with the coil group which only provides three permutations and in the instance illustrated is the group involving switch (4), (5) and (6), switch (5) being opened by cam 62S simultaneously with switches (4) and (5) when the sliders 32W and 32X are moved in opposite directions as indicated by the arrows thereon at the (8) switch station as more particularly described. With switches (4), (5) and (6) open no current will flow through the field and the two oppositely poled diodes 68 and 86 serially block current flow regardless of which switch of (7) or (8) is closed; in which case only one slider will be required for the diode switches.

Referring now to FIG. 8 showing the construction and arrangement of the sliders to provide the switch permutations of the coil permutations selected for best speed differentials, six sliders are shown whereby opening up switches (7) and (8) provide the "OFF" condition.

In the coil switches pattern depicted the action of each pushbutton in permutating the four central sliders between guides 63 by the overlapping toes 63 of the push rods is shown progressively along the top of FIG. 8 and at each coil permutation station, the movement of the four sliders is indicated therebelow on the sliders by the vertical row of arrows. For instance for coils ACD, sliders 32W, 32X and 32Z are moved to the right and slider 32Y is moved to the left. The movement of sliders 32W and 32X close switch (1) and opens switches (2) and (3) at their respective stations while sliders 32Y and 32Z open switches (4) and (6) and close switch (5) at their respective stations.

Thus the permutations can be controlled by the cams on the two sliders 32W and 32X for the coils A and B and by cams on the two sliders 32Y and 32Z for the coils C and D. The series making switch for the coils is never closed when either of the others is closed in both groups, but it is readily apparent that the permutation closing switch (5) while switches (4) and (6) are opened can be modified to open switch (5) if desired under these conditions and this can be done by adding the cam 62S on one slider (32W) of the second pair of sliders operating the other group of switches by sacrificing one of the four possible permutations of the first pair. This provides seven speeds with six switches, which speeds can be doubled in number with the two diodes only requiring two switches for alternate opening and closing.

By furnishing two diode sliders 32D7 and 32D8, the switches (7) and (8) not only can be alternately opened but they can be opened simultaneously to provide an "OFF" position. In this relationship, both sliders 32D7 and 32D8 are spring pressed to the left as viewed in FIG. 8 by compression springs 84 interengaging the diode slider and the end wall 85 of the slider chest 17.

The incline 60 in the diode switch recess 54D8 is eliminated and a shoulder 80 is employed as a latch element between the high dwell 56D and the elongated lower dwell 58D. The conductor 48D7 of the diode switch (7) in this instance is formed with a vertical side 82 to provide the other latching element and squarely abuts against the shoulder in latching relationship when the diode switch (7) is closed. This is also true of the slider 32D8 in the recess 54D8. The springs 84 urge the diode sliders 32D in the direction moving the shoulders 80 against the conductors whereby the high dwell 56D may slip under the conductor 48D and hold switches (7) and (8) open whenever the conductors 48D7 and 48D8 are raised. Otherwise both the resiliency of the conductors 48D and that of the springs 84 urge the continuance of the latch engagement against dislodgement by vibration. Raising the conductor is accomplished by movement of any switch permutation slider 32, all of which have protuberances 59 in their notches 54 at the diode switch stations and any time a slider is moved its protuberance 59 lifts the conductors to open switches (7) and (8) unless the sliders 32D held by either the curl 67S on the manually depressed OFF slider 18S or by any one of the curls 67 on the heel 57 of a push rod 28.

The diode slider 32D8 is actuated by the row of speed pushbuttons along with the permutation sliders 32 and when this is done the slider protuberances 59 lift the conductors 48D7 and 48D8 whereupon the diode sliders 32D7 and 32D8 are moved by spring 84 to the left as viewed in FIG. 8 so that the high dwells on both tend to be moved in under the lifted conductors to hold the switches (7) and (8) open. This also would tend to provide a "fail-safe" condition.

However, if a low speed button is pressed, slider 32D8 would be the only one held by a speed pushbutton and switch (8) conductor 48D8 would latch slider 32D8 and slider 32D7 would go to the left whereby switch (7) is open and switch (8) is closed for half-wave operation with whatever coil permutation that had been selected.

On the other hand when any pushbutton is actuated in the high-speed row the diode slider 32D7 would be forced to the right and latched while the same protuberances would raise the conductor 48D8 to let the diode slider 32D8 be urged to the left to hold switch (8) open while the switch (7) is closed to shunt out the diode 68. As either pushbutton is released after being pressed the respective slider is urged to engage the conductor with the shoulder 80 and establish the latching relationship discussed which holds the particular switch closed. Pressing another pushbutton in the same row only renews the latching relationship to remove any creep that may have occurred under vibration during the previous setting.

As already mentioned, the OFF pushbutton releases the latches to open both switches (7) and (8) and so arranged as described opens all three buttons (4), (5) and (6).

Assuming the switch (8) should be the switch remaining closed to provide a half-wave potential and switch (5) opens a low current serial connection of two coils under conditions where switch 2 is also closed, the sliders 32W and 32X are actuated as shown by the arrows thereon at the (8) switch position to close only switch (2) and the cam 62S on slider 32W opens switch (5) when sliders 32Y and 32Z open switches (4) and (6) when moved as indicated by the arrows thereon at (8) switch station. Accordingly slider 32D7 can be dispensed with.

If it is desired to eliminate the slider 32D8 and relay upon OFF switching other than open switches (7) and (8), the lower slider can be eliminated whereby the cams on the slider 32D7 perform the duty of alternating the open and closing of the switches (7) and (8). If any high-speed row button is pressed it would positively drive the diode slider 32D7 to the right to close and latch switch 7. If any low speed button is pressed the protuberances 59 on the speed switch sliders would release the latching relationship already described and the switch (7) would be held open while the switch (8) is closed. Otherwise the resting position of the pushbutton is in low-speed position while the switch (2) is brought into circuit for low-current flow while switch (5) is being opened with switches (4) and (6) already open for the OFF condition.

From the description it is apparent that the invention is compatible with a timer or jogger switch when the timer opens the circuit while the speed setting being employed remains.

Also it will be noted as described in Swanke et al. that the jog switch can be relocated in the circuit to bridge switch (4) in the OFF condition described and if desired the switches (1) and (3) be closed and switch (2) in open position in OFF conditions. This would result in jogging at a medium speed with coils A/B C, or, if the diode slider 32D8 were retained and slider 32D7 dispensed with, the jogging would be with coils A/B C at high speed. In both instances the only change would be to reverse the direction of the arrow on slider 32X at the (8) switch station.

It should also be noted that in either embodiment the switches (7) and (8), either one or both, whichever is used will serve to make and break the current and therefore carry the switching load while the speed switches, having short low (close) dwells and long high (open) dwells will merely serve as conductors with substantial economy on the contact points.

Having thus described embodiments of the invention illustrating the inventive concept in which three switches, for a pair of field coils of different conductance magnetically on the same side of an armature, provide four permutations with four cam dwells on two sliders in which one switch is not closed whenever either one or both of the other two switches are closed and including a permutation in which the pair of field coils are connected in parallel, it will be noted how several modifications in the use thereof can be made to provide at least eight possible permutations which can be doubled by the use of a diode or at least 14 possible permutations, 28 with a diode, where three coils having different conductivities are electrically connected on the same side of the armature, without departing from the spirit of the invention.

What is claimed is:

1. In a speed control for a fractional horsepower universal motor having field coils electrically connectable at one end to one side of the armature, two serially connected oppositely poled diodes, terminally connected between a source of alternating current and said armature and having a common connection between them,
   first switch means connected between said common connection and the other end of the field coils,
   second switch means directly connectable said other end of the field coils and said source, and
   means for alternately opening and first closing said first and second switch means.

2. The combination defined in claim 1 including means controlling said switch means to open said switch means concurrently.

3. The combination defined in claim 1 in which said field coils are of different impedances and including
   a switch to connect the coils in series, and
   manually controlled means for opening said switch and switch means concurrently.

4. In a speed control for a universal motor powered by alternating current the combination of a plurality of field coils of different impedances electrically connectable at one end to the armature,
   permutation switching means including a plurality of switches for interconnecting the coils in selected relationships to vary their composite effective impedance for the motor field and including at least two pushbuttons each separately coacting with said switches to provide said relationships,
   two serially connected oppositely poled rectifier means connected between said one end and a source of alternating current and having a common connection between them
   first switch means connected between said common connection and the other end of the field coils,
   second switch means directly connectable between said other end of the field coils and said source of alternating current,
   control means for said switch is movable in one direction by one of said pushbuttons to close said second switch means and open said first switch means to supply full alternating current to said field and released to move in another direction by the other of the two pushbuttons to open said second switch means and close said first switch means to supply rectified current to said field to provide two different speeds at said same relationship.

5. The combination called for in claim 4 including a third pushbutton for opening said switch means concurrently to deenergize the motor.

6. The combination called for in claim 5 in which said control means comprises a slider member having a cam inclined in one direction engaged by one of said pushbuttons and a cam inclined in the opposite direction engaged by the other pushbutton.

7. The combination called for in claim 6 which includes latch means for said switch control means activated by movement thereof by one of the pushbuttons and released by actuation of the other pushbutton.

8. The combination called for in claim 7 in which said latch means comprises a shoulder between a high and low dwell at the station for said switch which shoulder is engaged by the switch when the switch is closed, and
   means carried by said switching means to move said switch to the level of the high dwell when said other of the two pushbuttons is actuated.

9. The combination called for in claim 4 in which said control means comprises a slider having a cam inclined in one direction engaged by said one of said pushbuttons, and
   resilient means urging said slider in the opposite direction upon release of the latch means.

10. The combination called for in claim 4 in which said control means comprises a slider member for each one of said switch means having a cam inclined in one direction engaged by one of said pushbuttons and alternately opening and closing said switch means with respect to each other.

11. The combination called for in claim 10 which includes latch means for each of said two switch control means being activated by movement thereof by one of the pushbuttons and released by actuation of the other pushbutton.

12. The combination called for in claim 11 in which said latch means for each slider comprises a shoulder between a high and low dwell at the station for said switch which shoulder is engaged by the switch when the switch is closed, and
   means carried by said switching means to move said switch to the level of the high dwell when said other of the two pushbuttons is actuated.

13. The combination called for in claim 10 in which each slider includes a cam inclined in one direction engaged by said one of said pushbuttons, and
   resilient means urging each slider in its opposite direction upon release of the latch means to open each respective switch means, and
   a third pushbutton and slider for releasing the other sliders to the action of said resilient means for opening said switch means concurrently.

14. The combination called for in claim 10 in which said latching means for each slider member comprises a shoulder between a high and a low dwell at the station for said switch means which shoulder is engaged by the switch when the switch is closed, resilient means urging said slider in the direction opening said switch means, and means carried by said switching means to move said switch from engagement with said shoulder to the level of the high dwell when said other of the two pushbuttons is actuated for movement by said resilient means of the high dwell under the switch to hold the switch open.

15. In a speed control for a fractional horsepower universal motor having a plurality of cowound field coils of different impedances on the stator, electrically connectable at one end, one side of the armature, two serially connected oppositely poled diodes terminally connected between a source of alternating current and said armature and having a common connection between them, first switch means having a normally closed conductor connected between said common connection and the other end of the field coils, switch means having a normally closed conductor directly interconnecting said other end of the field coils and said source, switch control means for opening said conductors including a pair of switch control sliders independently movable between alternate positions and having notches along their top edge defining two stations with inclines related to provide three permutations of the sliders, pushbutton means engaging said slider inclines at each station, said sliders having recesses along their bottom edges one at each switch station, one of said sliders having cams in two recesses to close the first switch conductor while opening the second switch conductor with movement in one direction and opening the first switch conductor while closing said second switch conductor with movement in the other direction, the other one of said sliders having in two recesses cams coordinated with the movement of said first slider to close the switch closed by the one slider in alternate position and to open both switches in a third relative positioning of the two sliders.

16. In a speed control for a fractional horsepower universal motor a field including a plurality of field coils of different impedances, a speed control switch device for said coils including a first switch means for connecting said coils in series, second switch means for connecting said coils in parallel, control means for opening said second means and closing said first means, semiconductor circuit means bridging said field coils including oppositely poled serially connected semiconductors, means connecting one pole of one semiconductor to a source of power and a switch between said pole and one end of said field coils, and switch means connecting the other pole of said one semiconductor to said one end of said field coils.